(12) United States Patent
Lautmann et al.

(10) Patent No.: US 6,560,644 B1
(45) Date of Patent: *May 6, 2003

(54) DIRECTORY SERVICES NETWORK MANAGEMENT LOCATOR

(75) Inventors: John Lautmann, Freemont, CA (US); Mark Denny, San Jose, CA (US)

(73) Assignee: Cisco Technology, Inc., San Jose, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/396,958

(22) Filed: Sep. 15, 1999

(51) Int. Cl.$^7$ ............................................. G05F 15/173
(52) U.S. Cl. ........................ 709/223; 709/220; 709/222; 709/238
(58) Field of Search ............................... 709/220, 222, 709/238–242, 223

(56) References Cited

U.S. PATENT DOCUMENTS

| | | | | |
|---|---|---|---|---|
| 5,737,526 A | * | 4/1998 | Periasamy et al. | 709/241 |
| 5,790,117 A | * | 8/1998 | Halviatti et al. | 345/744 |
| 5,828,949 A | * | 10/1998 | Silver et al. | 379/170 |
| 5,838,907 A | * | 11/1998 | Hansen | 709/220 |
| 5,852,724 A | * | 12/1998 | Glenn et al. | 709/226 |
| 5,984,499 A | * | 11/1999 | Nourse et al. | 700/169 |
| 6,061,728 A | * | 5/2000 | Mead et al. | 709/227 |
| 6,065,062 A | * | 5/2000 | Periasamy et al. | 709/242 |
| 6,154,463 A | * | 11/2000 | Aggarwal et al. | 370/408 |
| 6,154,743 A | * | 11/2000 | Leung et al. | 709/220 |
| 6,226,788 B1 | | 5/2001 | Schoening et al. | |
| 6,269,099 B1 | * | 7/2001 | Borella et al. | 370/389 |
| 6,279,124 B1 | * | 8/2001 | Brouwer et al. | 709/328 |
| 6,345,294 B1 | * | 2/2002 | O'Toole et al. | 709/222 |
| 6,400,681 B1 | | 6/2002 | Bertin et al. | |

OTHER PUBLICATIONS

Pub. No. US 2001/0056490 A1.*
Pub. No. US 2002/0004744 A1.*
Request For Comments, No. 1795, published by the Internet Engineering Task Force (IETF), Mar., 1995, available on IETF website.
Timothy Howes, et al., *LDAP Programming Directory Enabled Applications With Lightweight Directory Access Protocol*, published by Macmillan Technical Publishing Co., Copyright 1997, pp. 21–34.
Tanenbaum, Andrew, *Computer Networks, Third Edition*, Prentice Hall, 1996, pp. 28–44.
Requests For Comments, published by the Internet Engineering Task Force (IETF), RFC 1777,in Mar. 1995, available at IETF website.
Requests For Comments, published by the Internet Engineering Task Force (IETF), RFC 1832, defines the LDAP Application Programmer Interface (API) available at IETF website.

* cited by examiner

*Primary Examiner*—Nabil El-Hady
(74) *Attorney, Agent, or Firm*—Cesari and McKenna, LLP

(57) ABSTRACT

A complete management system for specialized routers such as, for example, DLSw routers is provided. The management system uses a server to maintain a DLSw Directory, for example an LDAP directory. Whenever a DLSw router is booted, the DLSw router sends a registration message to the Server giving the network address of the DLSw router. The Server then maintains a directory of all DLSw routers in the network (the DLSw Directory). The information maintained in the DLSw Directory has the network address of each DLSw router, as received when the router is booted up. Also, at later times, the DLSw router sends a message to the DLSw Directory giving further information about the DLSw router. The further information comprises data such as: the types of encapsulation being received and routed by the router, etc.

41 Claims, 10 Drawing Sheets

FUNCTIONAL BLOCK DIAGRAM OF X.500 DIRECTORY SERVICE

| MAC ADDRESS | IP ADDRESS | TIME CREATED | ADDITIONAL DATA (MIB, etc.) |
|---|---|---|---|
| MAC1 | IP1 | TIME1 | ADDITIONAL DATA 1 |
| MAC2 | IP2 | TIME2 | ADDITIONAL DATA 2 |
| MAC3 | IP3 | TIME3 | ADDITIONAL DATA 3 |
| ⋯ | | | ⋮ |
| MACn | IPn | TIMEn | ADDITIONAL DATA n |

DIRECTORY SERVICE DATABASE
800

FIG. 8

DIRECTORY SERVICES NETWORK MANAGEMENT LOCATOR

RELATED APPLICATIONS

The following United States Patent Application is related to the present invention: U.S. Patent Application by Patrick Pak-Chiu Leung, Meng-Hsiung Lyu, and Anson Chen entitled Technique for Accessing Heterogeneous Directory Services in an APPN Environment, application Ser. No. 09/097,957, filed on Jun. 16, 1998 now U.S. Pat. No. 6,154,743, issued Nov. 28, 2000.

FIELD OF THE INVENTION

This invention relates to management of network resources, and more particularly to a central directory for network resources.

BACKGROUND OF THE INVENTION

It is standard engineering practice to generate a map of a computer network for the purpose of managing the network. Network management is ordinarily performed by software running on a server, where the software is referred to as a "Network Management Platform". Well known commercial Network Management Platforms include the Hewlett Packard "open view" product, the IBM "Net View" product, etc. Network Management Platforms ordinarily use Simple Network Management Protocol (SNMP) standard methods for creating a directory of SNMP capable devices. The Network Management Platforms locate all SNMP capable devices on the network. Information held in the Network Management Platform for each SNMP device includes, at a minimum, the network address of the device, the protocol needed to reach the device, and the type of device such as router, end station, bridge, etc.

It is desirable for users of data link switching routers (DLSW) routers, which forward packets according the protocol described in RFC 1795, to construct a map of the DLSw routers. RFC 1795 stands for "Request For Comments" Number 1795, published by the Internet Engineering Task Force (IETF) in April 1995, and available at the IETF website at the URL www.ietf.org. All disclosures of RFC 1795 are incorporated herein by reference. As additional references are made hereinbelow to various RFC documents, it is to be understood that they refer to "Request for Comments" of the IETF, and that they are available at the IETF web site.

A map of the DLSw routers, ideally, gives the topology of the DLSw devices, gives the address of each DLSw device, and in many cases gives important management information such as the types of encapsulation being forwarded by the router, the number of errors recorded by the router, the data rates (bytes or packets per second, etc.) at any particular time arriving at the router, etc. Detailed information which is valuable to management of a DLSw router network is not ordinarily available in the entries of a Network Management Platform. Accordingly, a DLSw router management function must use a two level polling operation in order to utilize a standard Network Management Platform.

The two level polling operation requires that the Network Management Platform first polls all SNMP capable devices in order to build up its directory. The DLSw router management tool must then obtain the network address of all devices in the Network Management Platform directory, and using that address send each device a polling message asking if the device is a DLSw router. The directory may contain thousands of SNMP capable devices scattered throughout the network, and only a few hundred of these devices may be DLSw routers. Thus only about one in ten (perhaps only one in a hundred) of the polling messages sent out by the DLSw router management tool is useful, and the other nine to ninety nine out of a hundred polling messages waste network bandwidth.

An alternative to using a two level polling system in connection with a Network Management Platform is to have "seed" routers configured in the DLSw router network. A seed router has the address of all "peer" DLSw routers: Often the seed and peer routers are logically arranged in a hub and spoke topology, with the seed router at the hub and connected logically with the various peer routers connected as spokes. The seed router can then obtain detailed information about the "spoke" peer routers. The seed router then constructs maps of the DLSw network by polling its peer routers, and can include as much detailed information as the user desires on the maps.

However, a disadvantage to the seed router is that many of the peer routers on the spokes of the seed router have other peer routers which are not logically connected to the seed router. Thus two classes of routers are introduced, those connected to the seed router, and those not connected. Protocols must be developed to handle various exceptions. Accordingly, the seed router has no direct way of knowing about these further distant DLSw routers, and cannot include them in the maps which it constructs. A solution to this difficulty is for the spoke peer routers of the seed router to forward management messages from the seed router. However, this arrangement increases the complexity of the DLSw router management system.

A further standard engineering practice which is used to build a database of specialized devices is to have the device log into an account maintained on a server, and then to have a person enter verification data such as a password to establish the connection. The server then maintains a list of all verified connections as the database. For example, the specialized devices may be desktop computers and the verified connections may be to a network 'server which provides connectivity between the desktop computers and a computer network. The list of verified connections to the network is then maintained as a database in the server. However, this method of using a verified connection to help build a database of devices is not suitable for building a database of routers. Topologically, routers do not log into a central server to establish a network connection, rather, in contrast, the routers are links in the network. That is, routers connect various local area networks (LANs) together, connect the LANs to wide area connections, etc. Also, a router does not have a person enter a password to establish a verified account in a server. Therefore, the verified account method of building a list of devices on a server is unsuitable for establishing a database of routers.

For routers using any protocol, in addition to the DLSw example, there is a need to create a topological map of the network connection of the routers. Each router will normally utilize a particular protocol, or perhaps a router may be capable of using several different specialized protocols such as the DLSw example. In any case, the Network Management Platform can be used to create the topological map and show the protocols is used by each router, but again two levels of polling are required. In the first level of polling, the Network Management Platform makes a list of SNMP capable devices, and in the second level of polling, each of these devices is sent a message asking if it supports a specific type of specialized routing protocol. Also, in each case, a seed router can be set up to develop a list of specialized routers, but then the same limitations of the hub and spoke connections create complexity in the system.

There is needed a method and apparatus to provide a complete management system for specialized routers, such as for example DLSw routers. The method and apparatus should avoid the waste of network bandwidth which occurs when two levels of polling are used by a standard Network Management Platform, and should avoid the complexity introduced by use of seed routers.

SUMMARY OF THE INVENTION

A complete management system for specialized routers such as, for example, DLSw routers is provided. The management system avoids the waste of network bandwidth which occurs from use of two levels of polling as used by a standard Network Management Platform, and also avoids the complexity introduced by use of seed routers.

The management system uses, for example, an LDAP server to maintain a DLSw Directory. Whenever a DLSw router is booted, the DLSw router sends a registration message to the LDAP Server giving the network address of the DLSw router. The LDAP Server then maintains a directory of all DLSw routers in the network (the DLSw Directory). The information maintained in the DLSw Directory has at least the network address of each DLSw router, and it receives at least this amount of information from the registration message received as the router is booted up.

Also, at a later time, the Network Management Application sends a message to the routers in the directory requesting further information. The routers then return this further information to the DLSw Directory. The further information comprises data such as: the types of encapsulation being received and routed by the router; the data rate in bytes per second or packets per second; the errors reported to the router; the errors detected by the router; the number of packets routed to each destination router; the number of routed packets of each type of encapsulation detected; the time at which any particular information was written into the DLSw Directory; etc. This further information may be requested from the DLSw routers listed in the DLSw Directory on a timed basis, for example, request messages may be transmitted on a timed interval so that the DLSw Directory can monitor data rates and loss rates in real time.

In the event that the directory: service does not return an ACK message within a timeout time interval, the router transmits an inquiry message to peer routers. A peer router answers the inquiry message with a message containing an address of a directory service of routers. The router then sends a registration message, using the received address, to the directory service.

BRIEF DESCRIPTION OF THE DRAWINGS

Referring now to the drawings, in which like numerals represent like parts in the several views:

FIG. 8 is a block diagram of a table of a directory service.

DETAILED DESCRIPTION OF AN ILLUSTRATIVE EMBODIMENT

Figure 1:
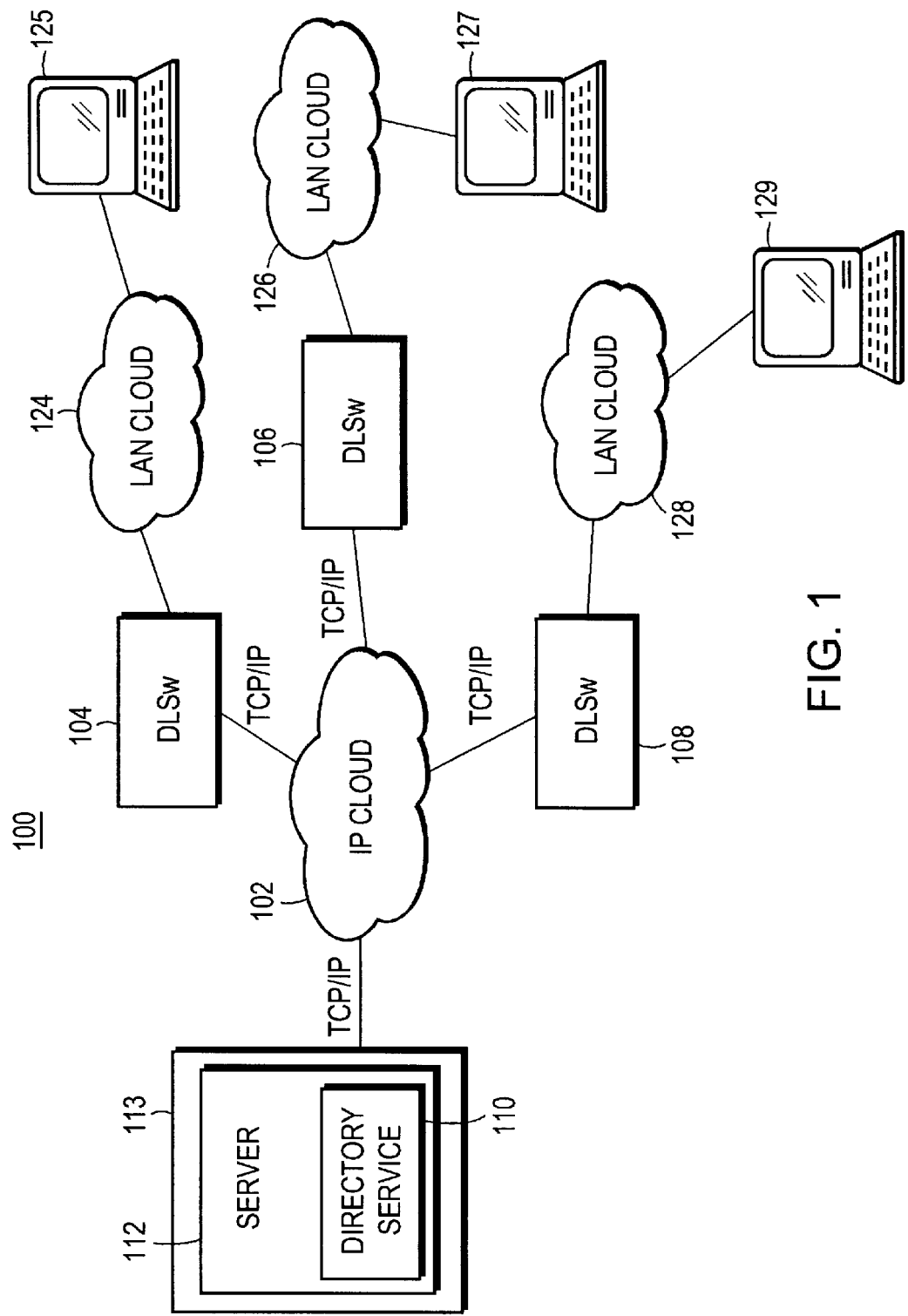
FIG. 1 is a block diagram of a computer network.

Turning now to FIG. 1, network 100 comprises a computer network cloud 102, routers 104, 106, 108 implementing DLSw switching, and DLSw directory server 112 running on computer 113. Directory server 112 implements directory service 110.

Network cloud 102 is a shorthand tool for describing many routers interconnected to form a possibly large computer network. The routers communicate by use of IP protocol through network cloud 102, and so network cloud is also referred to as an "IP" network cloud. Ordinarily, DLSw routers 104, 106, 108 communicate through network cloud 102 using the TCP/IP protocol. Also, network cloud, 102 may support other communications protocols. As an example, network cloud 102 may represent only a few routers forming a network internal to a small business, or for example, network cloud 102 may represent all of the computers and routers forming the worldwide Internet. A more common situation is that network cloud 102 represents around a few hundred routers interconnected within a corporate Intranet, and the routers exchange packets using the DLSw protocol.

Each router 104, 106, 108 is connected to one or more Local Area Networks (LANs), as represented by LAN clouds 124, 126, 128. Each of the LAN, clouds may represent one or more different kinds of LANs. For example, router 104 may be connected, at different ports (not shown), to an IEEE 802.5 token ring LAN, or to an IEEE 802.3 Ethernet LAN, or to an FDDI token ring LAN, etc., any or all of which are represented as a LAN cloud 124, 126, 128.

As an example, DLSw router 104 connects to network cloud 102 by a connection supporting TCP/IP protocol, and also connects to one or more LANs in LAN cloud 124. One representative end station 125 is shown connected to LAN cloud 124. For example, end station 125 could be connected to an IEEE 802.5 token ring LAN, or for a further example end station 125 could be connected to an IEEE 802.3 Ethernet LAN etc. Similarly, end station 127 connects to a LAN within LAN cloud 126, and also end station 129 connects to a LAN within LAN cloud 128.

Directory Server 112 is a computer program running on a computer 113, and Directory Server 112 implements directory service 110. Directory service 116 is a database which has an entry for each DLSw router. As Each DLSw router boots up, it transmits a registration message to directory service 110, thereby populating the database of directory service 110. Directory service 110 is then maintained up-to-date by subsequent messages transferred between the DLSw router and directory service 110.

Figure 2:
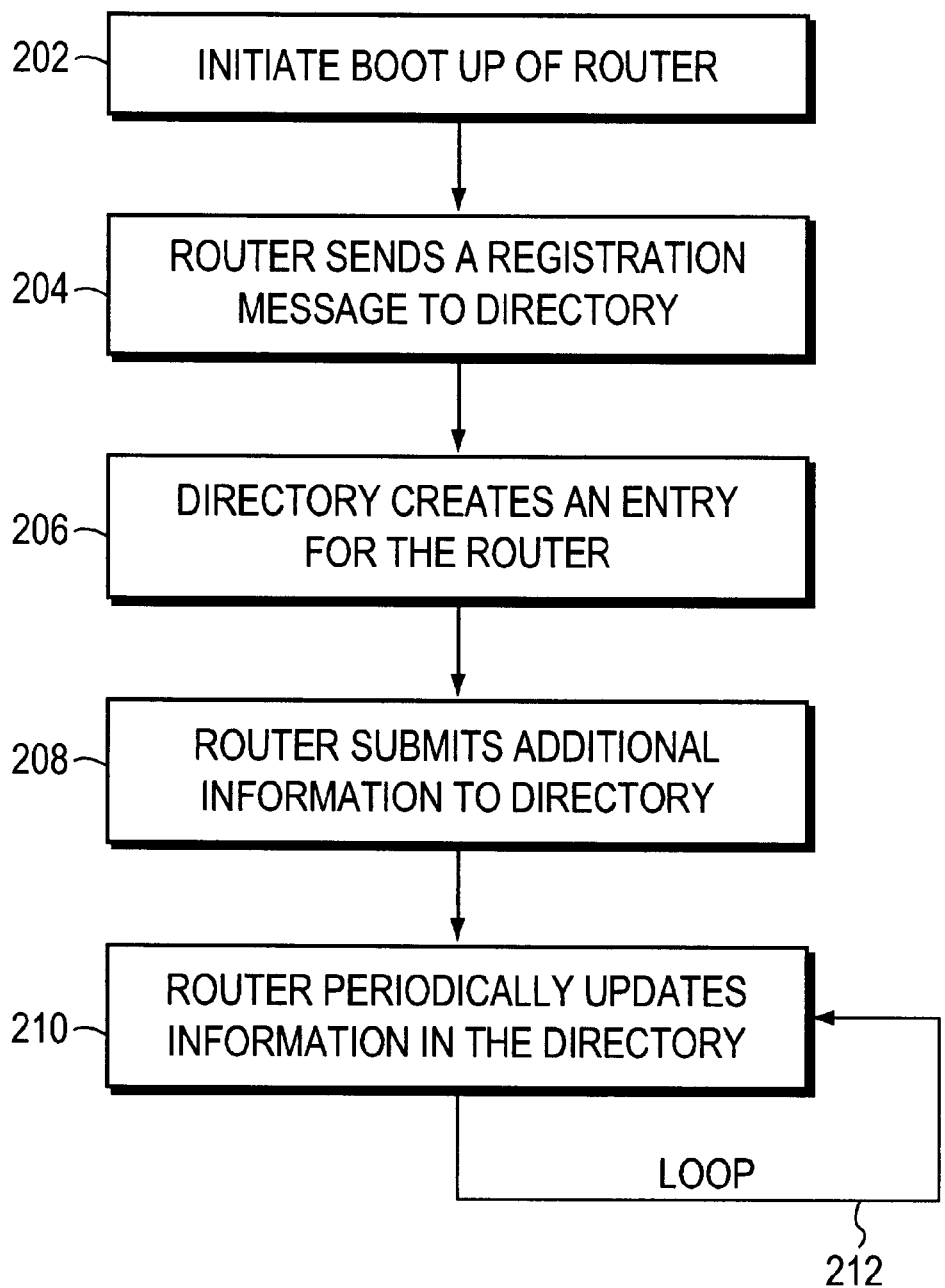
FIG. 2 is a flow chart showing the invention.

Turning now to FIG. 2, a flow chart of process 200 showing operation of directory service 110 is shown. At block 202 a router offering DLSw switching is booted. For example, a new router may be connected to the network and made operational, or as a further example, an old router may have been turned off, and is once again made operational by being "booted". As shown in block 204, during the "boot up" process the router transmits a registration message to a directory database, such as DLSw directory service 110, maintained on a server.

As shown in block 206, the Directory creates an entry for the router transmitting the registration message of block 204, in response to receipt of the registration message received from the router. Later, as, shown at block 208, the router submits additional information to the Directory. The router may submit additional information based on a timer within the router, based on a timer within the Directory, based on the router obtaining additional information from elsewhere, etc. The additional information may include the number of packets transmitted using DLSw protocol, the number of packets received using DLSw protocol, the number of corrupted packets (that is failing a CRC check), the LAN protocol of the packets which it is encapsulating into DLSw protocol (for example, SNA, NetBios, etc.), the LAN protocol of the packets which it is forwarding after receiving and decapsulating DLSw packets, other management information, etc. Process 200 then goes along path 209 to block 210.

At block 210 the data in the directory database of directory service 110 is updated. There are a plurality of different types of events which can lead to update of information in directory service 110. Examples of events which can lead to update of in formation within directory service 110 include: expiration of a timer within the directory service 110, stimulating the server 112 to transmit an inquiry message to the router, and the router responding to the inquiry message; and, new information becoming available to the router such as loss of contact with a neighbor router (that is an increase in the number of failed attempts to send a message to the neighbor router), etc., stimulating the router to transmit the new information to the directory service 110. Path 212 illustrates the waiting, or looping, of the router between transmissions of up-dated information to directory service 110.

Figure 3:
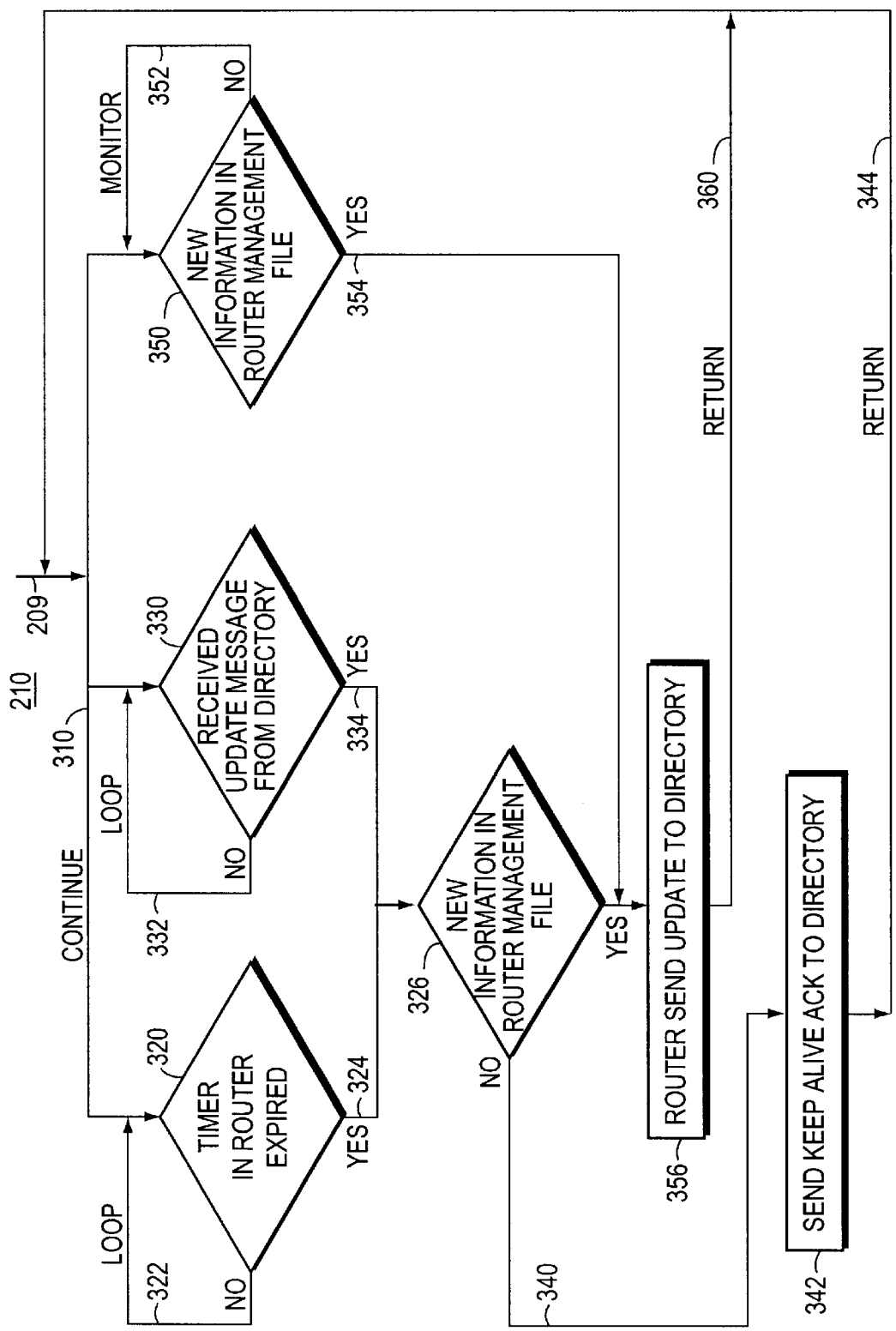
FIG. 3 is a flow chart giving detail of a block of FIG. 2.

Turning now to FIG. 3, internal structure of flow diagram 200 at block 210 is shown. Path 209, shown in FIG. 2, leads to continue point 310. At continue point 310 process 200 pauses while waiting for an event to occur. At block 320 the process waits for a timer in the router to expire, as is shown by loop path 322. In the event that the timer has expired, the process proceeds along path 324 to decision block 326.

In an alternative embodiment of the invention, continue point 310 also permits the process at block 330 to wait for receipt of a message from directory service 110. Loop path 332 indicates that process 200 is simply waiting at block 330 for the router to receive a message from directory service 110. Normally, a timer is running in directory service 110, and when it expires directory service 110 transmits a message to the router, and it is this message which process 200 is waiting to receive at block 330. Upon receipt of the message from directory service 110, the process goes from block 330 along path 334 to decision block 326.

At decision block 326 the process determines whether or not any new information has developed in the router since the last update to directory service 110. In the event that no new information has developed, then process 200 goes along path 340 to block 342. At block 342 process 200 sends an "Acknowledgment keep alive" message (ACK keep alive message) to directory service 110. Receipt of the ACK keep alive message by directory service 110 informs directory service 110 that the router is still alive and functioning, and so directory service 110 updates its expiration timers to indicate that the router is functioning. Upon completion of transmission of the ACK keep alive message at block 342, process 200 goes to path 344 where it returns to path 209, and continue point 310. At continue point 310 process 200 again waits for the occurrence of an event before again updating directory service 110.

In the event that new information has developed, then decision block 326 transfers process 200 to update block 356.

Continue point 310 also waits for decision block 350. Decision block 350 monitors the router for receipt of new information which it should transmit to directory service 110. Monitor path 352 indicates that decision block 350 does nothing until it detects that new information is available to send to directory service 110. In the event that decision block 350 detects that the router has new information to send to directory service 110, then decision block 350 transfers process 200 to path 354. Path 354 takes process 200 to update block 356.

At update block 356 process 200 sends updated router information to directory service 110. Upon completion of transmitting updated information to, directory service 110, block 356 transfers process 200 to path 360. Path 360 transfers process 200 to path 344. Path 344 returns process 200 to path 209, and to continue point 310, where process 200 again waits for the occurrence of an event before again updating directory service 110.

X.500 DIRECTORY

Figure 4:
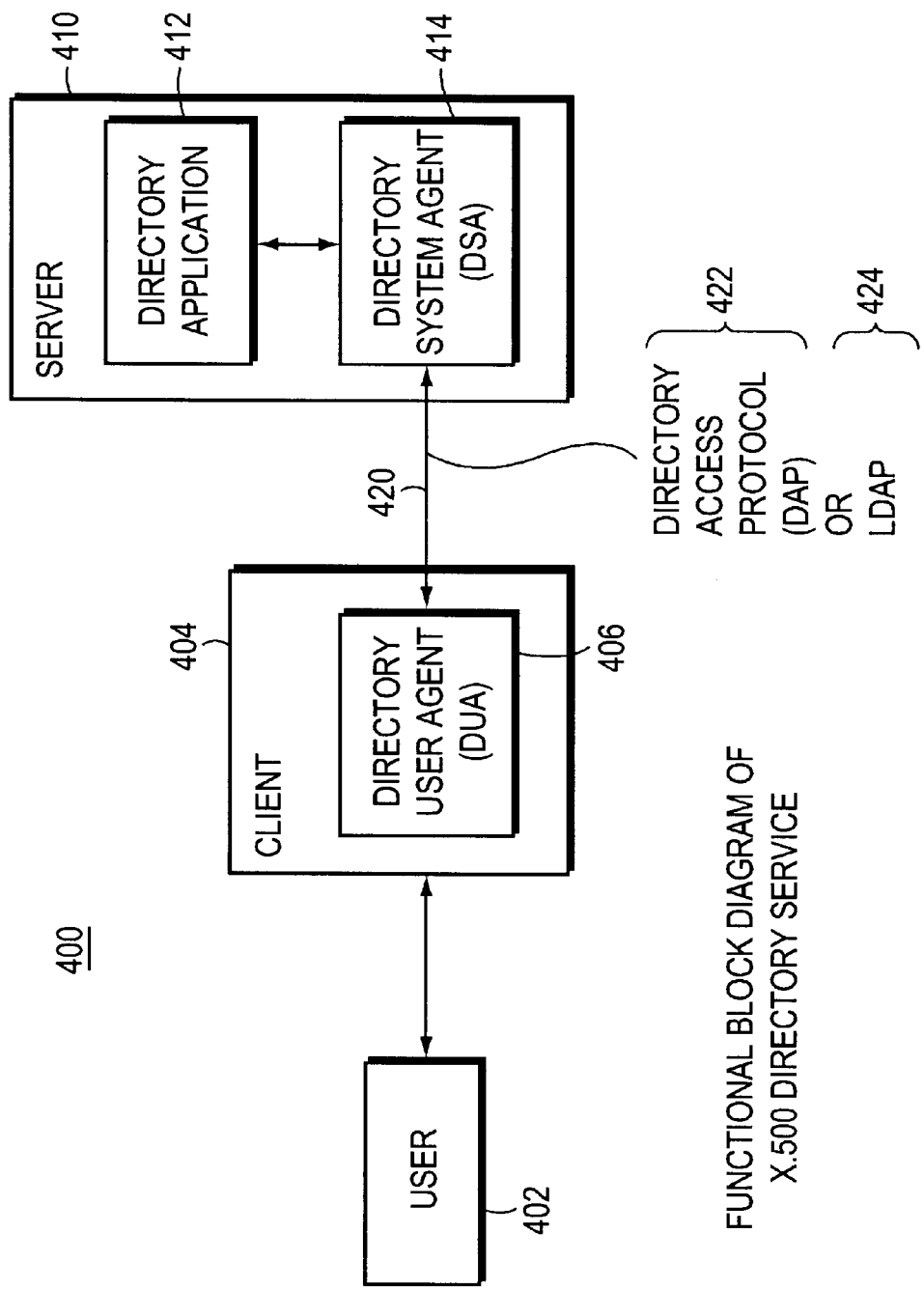
FIG. 4 is a functional block diagram of a directory server.

The X.500 Directory Service is based on the "client-server" principle, as shown in FIG. 4. More details than discussed hereinbelow are available in many publications, for example the book by Douglas Steedman, *X.500 The Directory Standard and its Application*, published by Technology Appraisals Ltd. Copyright 1993, all disclosures of which are incorporated herein by reference.

The user 402 has an "assistant" as a computer code executing in the user's client computer 404. The user's assistant is the "directory user agent" (DUA) 406. The DUA 406 is an application software component in client computer 404 to facilitate user access to the Directory Service. The Directory Service is provided by the DUA 406, and server 410 on which execute the Directory Application 412 and the directory system agent DSA 414. Generally, the DSA 414 resides on a background computer such as server 410 of which users need no knowledge. Communication 420 between DUA 406 and DSA 414 takes place via the standardized Directory Access Protocol (DAP) 422, or the simplified variant the Lightweight Directory Access Protocol 424 (LDAP). LDAP 424 can be used for clients in networks based on the TCP/IP protocol. LDAP is based on a client-server model in which a client makes a reliable connection over TCP or other transport layer to an LDAP server, and over that connection both sends requests and receives responses for directory information.

A directory is a special purpose database containing directory information. LDAP provides an easy way to retrieve as well as manage data stored in directories. The LDAP protocol is defined, in RFC 1777, known as LDAP v2. An informational RFC (RFC-1832) defines the LDAP Application,Programmer Interface (API).

An application, that is user 402, generally uses the LDAP in four steps:
1. Open a connection 420 to an LDAP server, for example server 410.
2. Authenticate to the LDAP server and/or to the X.500 DSA 414.
3. Perform some LDAP operations and: obtain some results.
4. Close the connection 420.

In DLSw the X.500 directory service is used for storing the directory service 110 information of DLSw routers.

DIRECTORY MESSAGE PROTOCOL

In a preferred embodiment of the invention, the protocol for transfer of messages between a typical router such as router 104 and directory service 110 is through the Lightweight Directory Access Protocol (LDAP) as defined in RFC 1777, where as stated above, RFC stands for "Request For Comments" published by the Internet Engineering Task Force (IETF) in March 1995, and available at the IETF website at the URL www.ietf.org. All disclosures of RFC 1777 are incorporated herein by reference.

The LDAP protocol was developed as a method of accessing a Directory referred to as the X.500 Directory. The X.500 Directory is defined in international standards, for example, as described by Timothy Howes, et al, in their book *LDAP Programming Directory Enabled Applications with Lightweight Directory Access Protocol*, published by Macmillan Technical Publishing Co., Copyright 1997, all disclosures of which are incorporated herein by reference, particularly pages 21–34.

Representative features defined by the LDAP protocol for interacting with the directory service 110 database (the "directory" in the notation of LDAP RFC 1777) maintained by the server 112 comprise, for example, the following. The LDAP protocol provides simple management and browser access to the X.500 Directory including read and write interactive access. The access carries less overhead than using the Directory Access Protocol defined with the X.500 Directory definition. The protocol elements are carried over a simple transport, for example TCP/IP, or for a further example, Connection Oriented Transport Service (COTS). Many of the protocol elements are carried as simple strings, for example carried as ASCII characters. The general model of LDAP is one of clients, for example router 104, performing protocol operations against servers, for example directory server 112. A client transmits a protocol request describing the operation to be performed to a server. The server is then responsible for performing the necessary operations on the directory. Upon completion of the necessary operations, the server returns a response containing any results or errors to the requesting client. No synchronous behavior on the part of clients or servers is required, as requests and responses for multiple operations may be exchanged by client and servers in any order. The requirement is that clients eventually receive a response for every request that requires one.

All protocol exchanges between client and server are encapsulated in a common envelope, the LDAP message. Details concerning the LDAP message may be found in RFC 1777.

As a further example of database implementation of the directory service 110, any convenient standard database system may be used. For example, a database using an Oracle Systems commercial database, a Microsoft Access commercial database, etc. could be used. The protocol for message passing between a router such as, for example, router 104 and the database of the directory service 110 would then employ the protocols specified by the database manufacturer, for example Standard Query Language (SQL), etc.

Figure 5:
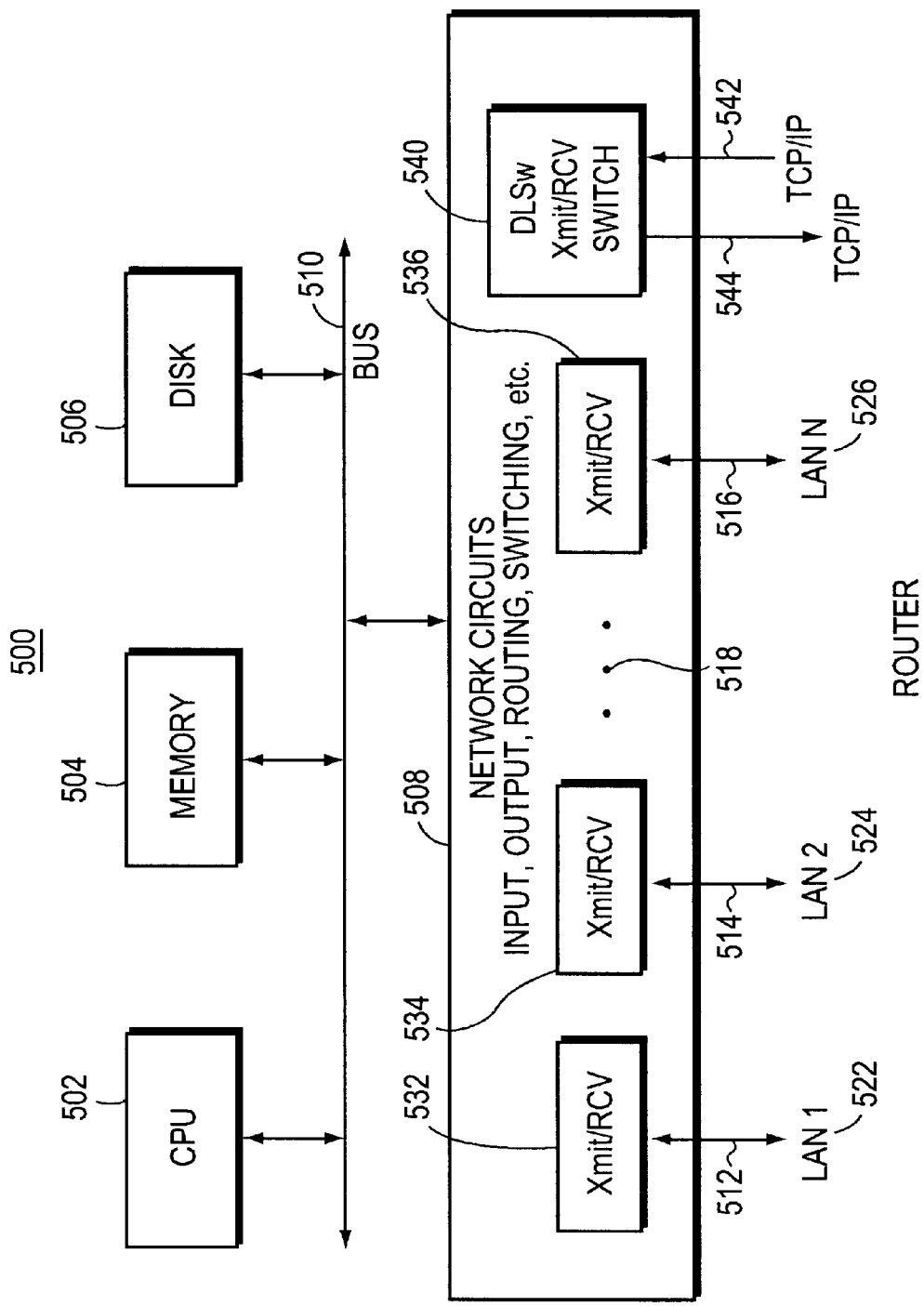
FIG. 5 is a block diagram of a typical router.

Turning now to FIG. 5, a block diagram of a typical router 500 is shown. Central processor unit (CPU) 502 manages operation of the router. Memory 504 holds data structures, data, and instructions useful to operation of router 500. Memory 504 may be any type of electronic memory, Random Access Memory (RAM), Read Only Memory (ROM), etc. Disk 506 is an internal disk drive to facilitate operation of router 500. Disk 506 is optional, and many designs of routers do not use an internal disk drive 506. Network circuit 508 contains the major routing circuits of router 500. Bus 510 connects the CPU 502, Memory 504, Disk (if any) 506, and network circuits 508 together so that they can exchange information by use of typical bus protocols.

Network circuit 508 contains the circuits responsible for input from local area networks (LANs) output to LANs, circuits for routing of data packets, and circuits for performing switching. Particularly, switching of packets using only Layer 2 constructs is accomplished by network circuit 508. Each port 512, 514, 516 of router 500 connects to a different local area network (LAN). For example, port 512 connects to a LAN designated as LAN1 522. Port 514 connects to LAN2 524. There may be a large number of ports, and the highest numbered port is represented as port N 516, where LAN N 526 is shown connected to port N 516. The three dots 518 indicate that network circuits 508 may serve many router ports. Each port is connected to its transmitter and receiver 532, 534, 536.

Transmitter and receiver circuit Xmit/RCV 532 serves port 512 and LAN 1 522. Xmit/RCV circuit 534 serves port 514 and LAN 2 524. There is a transmit and receive circuit for each LAN, and so correspondingly Xmit/RCV circuit 536 serves port N 516 and LAN N 526.

DLSw transmit and receive switch (DLSw Xmit/RCV switch) 540 controls the TCP/IP ports used in DLSw switching. Two TCP/IP ports are required by RFC 1795 for implementing TCP/IP switching, one for receiving and one for transmitting. Port 542 is the receive TCP/IP port, and port 544 is the transmit TCP/IP port. Additional types of ports may be implemented in network circuits 508, for example a point to point line between two routers could be implemented (not shown in FIG. 5), etc.

Although the examples shown in FIGS. 1 and 5 highlight DLSw switching as an, example of peer to peer routers, other switching or routing formats may be used to illustrate the invention. In any event, the peer to peer routers (illustrated in FIG. 1 as DLSw routers) transmit a message as they boot up to a directory service such as directory service 110 in server 112 in computer 113. The process illustrated by the flow charts of FIG. 2 and FIG. 3 then gives the operation of directory service 110 as the peer to peer routers boot up and register with the directory service, and further as the peer to peer routers update the directory.service 110 as network conditions change dynamically.

Figure 6:
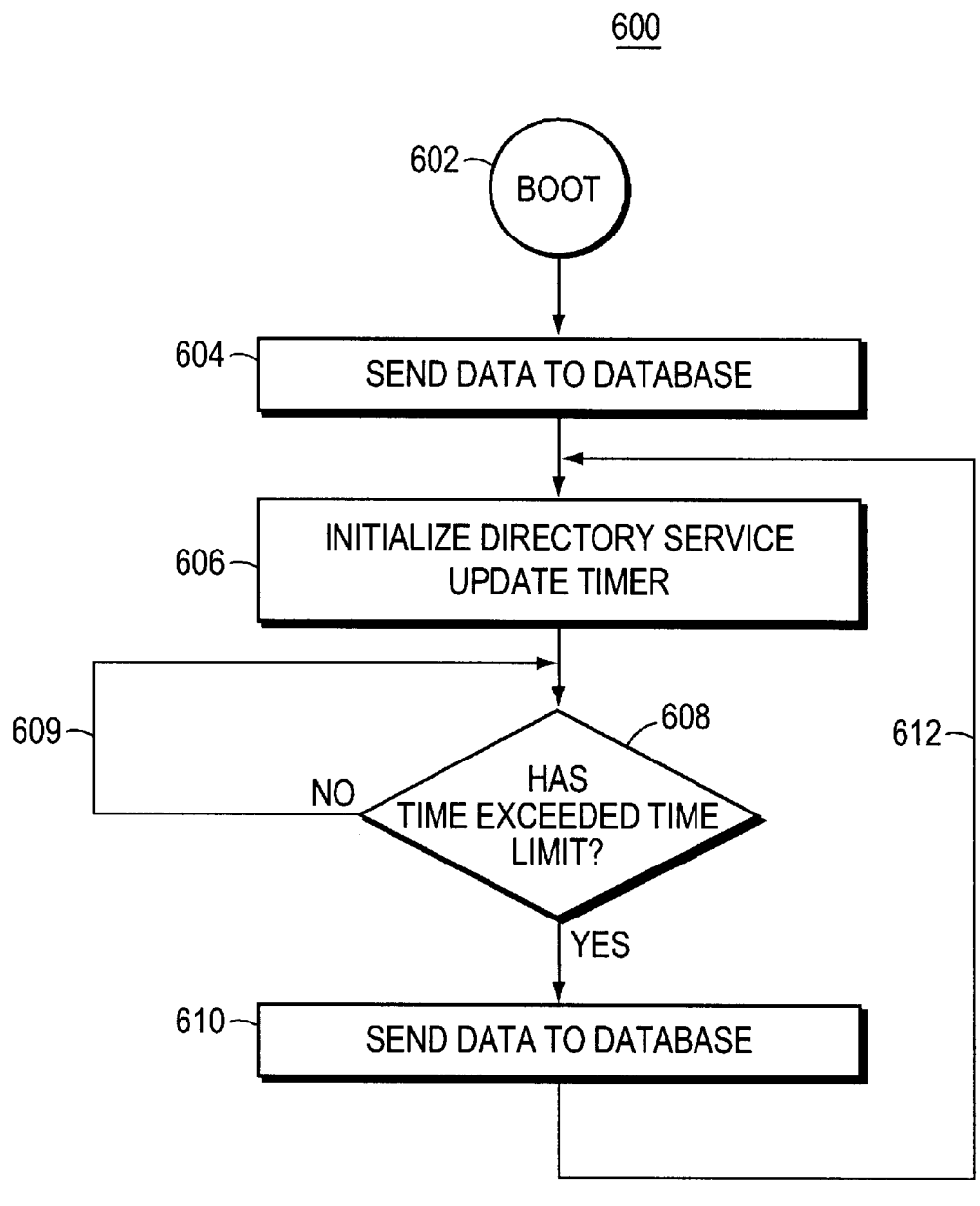
FIG. 6 is a flow chart of a thread executing in a router.

Turning now to FIG. 6, there is illustrated a thread 600 executing in a router such as a peer to peer router implementing the invention. At block 602 the router is booted, that is the router is turned on, and the process goes to block 604. Booting a router, or any processor based apparatus, is ordinarily accomplished by having the processor execute a boot script. A boot script is normally a sequence of instructions which tell the processor to do tasks which bring the router or computer into operation. At block 604 the router registers with the directory service 110 by sending a message to the Directory Service, and the process goes to block 606. At block 606 a timer is initialized, the Directory Service Update Timer. From block 606 the process goes to block 608. At block 608 it is determined whether or not the timer has expired, and in the event that the timer has not expired the process loops on path 609 until the timer expires. When block 608 determines that the timer has expired, the process goes to block 610.

At block 610 updated data is sent by the router to the directory service 110. The updated data sent to the directory service 110 at block 610 may include the complete set of Management Data normally associated with management of a router. For example, the data sent at block 610 may include the number of active ports, the traffic rate on each port, the types of packets routed on each port, the number of peer to peer packets switched, the number of corrupted packets on each port, etc., etc. This full set of management data is referred to as the Management Information Base, or MIB. For example, the MIB for DLSw routers is defined in RFC 2024. From block 610 the process returns along path 612 to block 606 where process 600 repeats, with the Directory Service Update Timer again being initialized at block 606.

In an exemplary embodiment of the invention, a first router receives a registration message transmitted by a second router, where the second router does not have knowledge of the IP address of the directory service 110. Peer routers normally become aware of other peer routers on the network, and also normally exchange capability information with peer routers. A peer router undergoing the boot-up process may transmit a registration message using an IP address written into its boot script, however the address may be stale and no longer a valid IP address for directory service 110. In this event the booting router will not receive an acknowledgement message (ACK message) from the directory service 110. Upon expiration of an acknowledgement timer in the booting router, the booting router then sends inquiry messages to each of its known peer routers asking for the IP address of the directory service 110. Each peer router receiving such an inquiry message then replies to the booting router with a reply message containing the IP address of directory service 110. The booting router may receive several such reply messages, one from each different peer router. In the event that all of the reply messages contain the same IP address for directory service 110, the booting router then simply sends a registration message to the directory service 110. In the event that different reply messages contain different IP addresses for directory service 110, then the booting router simply tries each until it finds the directory service 110.

Figure 7:
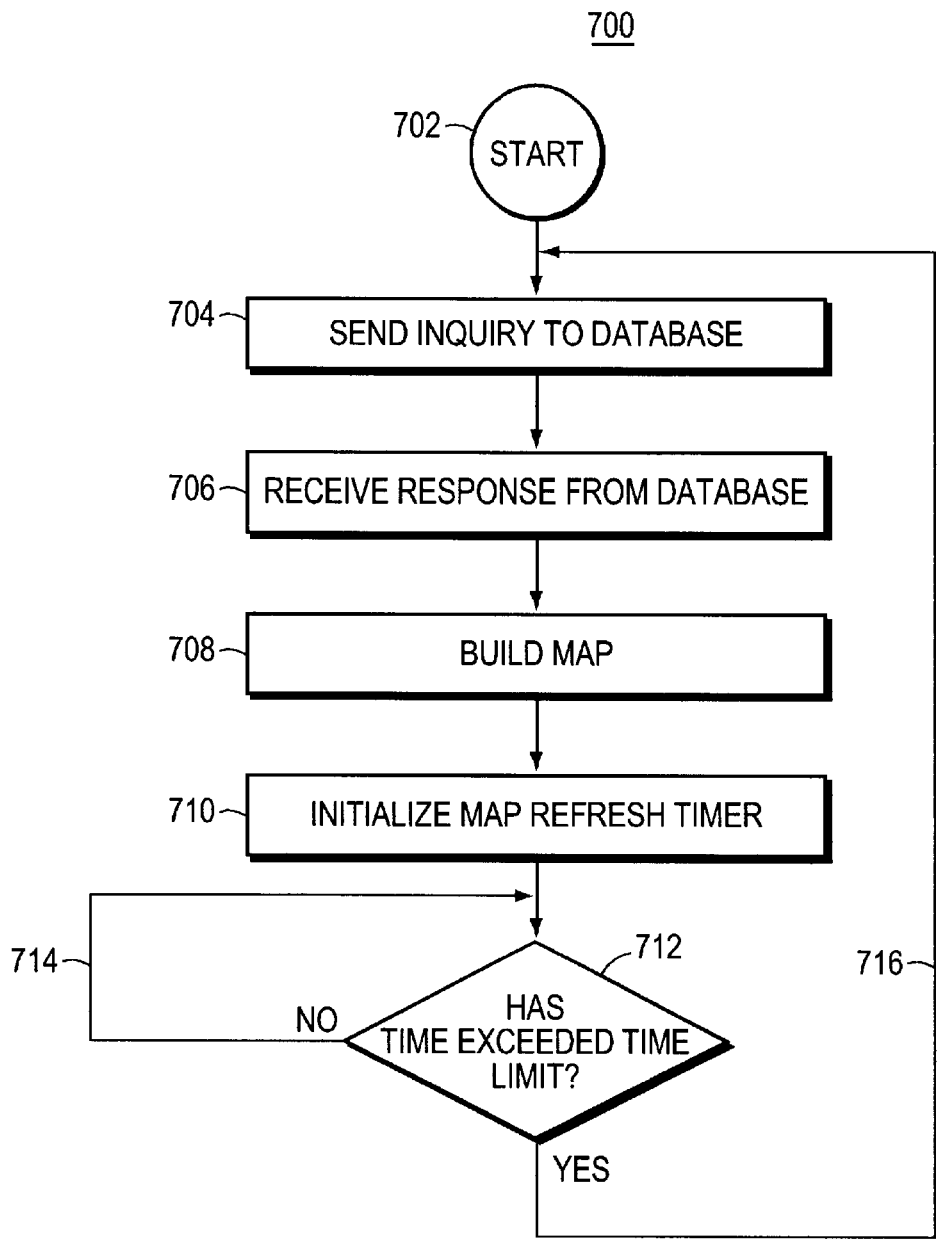
FIG. 7 is a flow chart of a thread running in a map utility program.

Turning now to FIG. 7, there is shown a flow diagram of a thread 700 executing in a computer used to monitor the computer network of peer to peer routers. As an example, any computer connected to network cloud 102 may be used to monitor the peer to peer computer network, for example end stations 125, 127, or 129 may be used to monitor the network. In any event, thread 700 executes in the computer used to monitor the computer network. At block 702 the process 700 starts, and goes to block 704. At block 704 the process sends an inquiry message to directory service 110, and the process then goes to block 706. At block 706 the process receives a response from the directory service 110, and the process goes to block 708.

At block 708 the process uses data in the response received at block 706 to build a map of the peer to peer network of routers, for example as shown in FIG. 1. For example, the data received in the response at block 706 may include the full content of the data normally retained in the Management Information Base MIB for each router in the network, for example in the DLSw router example, the MIB as it is specified in RFC 2024. From block 708 the process goes to block 710.

At block 710 a Map Refresh Timer is initialized. From block 710 the process goes to block 712. At block 712 it is determined whether or not the timer has expired, and in the event that the timer has not expired the process loops on path 714 until the timer expires. When block 712 determines that the timer has expired, the process goes to path 716. Path 716 returns the process to block 704 where a new inquiry is sent to directory service 110. The response is again received at block 706, and a new map of the peer to peer routers is constructed at block 710, etc.

Accordingly, the routers continually refresh the directory service 110 under the control of timer blocks 606 and 609 of the thread 600 executing in the router. And the thread 700 executing in a computer monitoring the network maintains a refreshed map of the peer to peer computer network by refreshing its information under the control of timer blocks 710 and 712.

The layers of the communications models are implemented in various convenient hardware elements as shown in the block diagram of a router of FIG. 5. For example, depending upon the design of the router, Layer 1 and Layer 2 functionality may be implemented in hardware in the circuits of network circuits 508. Alternatively, field parsing and recognition functions may be implemented in software which executes on CPU 502 in connection with memory 504. Higher layer functions such as Layer 3 network or internet protocols may be implemented in software executing on CPU 502. Layer 4 reliable transport implemented in the transport layer or internet layer is usually implemented in software executing in CPU 502, although even Layer 4 functions may be implemented in hardware by using an ASIC semiconductor chip.

Directory Server 112 is a computer program, that is software, and may execute in a router such as router 500 of FIG. 5. The database of the directory service 110 and may be stored in memory 504 of a router 500. Alternatively, the directory server 112 may be implemented in a computer which is not a router, and which therefore does not have network circuits 508, but has a CPU and memory similar to those shown in router 500, but has a simple connection to the computer network such as one port. The database of the directory .server 110 is then implemented in the memory of the computer, as illustrated by memory 504.

Turning now to FIG. 8, there is shown a typical directory service database table 800. Directory service database table 800 holds the entries of directory service 110. Row 802 is the column headings of table 800. Column 804 holds the MAC address of a peer router. Column 806 holds the IP address of the peer router. Column 808 holds the time that the entry for the router was created. Column 810 holds any additional data collected in table 800 for the router. For example, in the DLSw router example, column 810 may hold all of the data specified in RFC 2024, which specifies the Management Interface Data Base. The data in table 800 is sent to directory service 110 by each router at block 604 and at block 610 of the flow chart of FIG. 6.

Row 820 contains the entries for a first router, for example router "1". The MAC address is indicated as MAC 1 and is in column 804. The IP address is indicated as IP1 and is in column 806. The time that the entry was created is indicated as time 1 and is in column 808. The additional data is indicated as "additional data 1" and is in column 810.

Entry data for router "2" is in row 822 and is indicated as MAC2, IP2, time2, and "additional data 2". Entry data for router "3" is in row 824, and so forth through row 826 which holds entry data for the n'th router. There is a row entry for every router which has registered with directory service 110.

The time entry in column 808 indicates the time at which the entry was created, and may be used to expire the address information in the entry in order to eliminate stale entries from the directory service 110 table 800.

Figure 9:
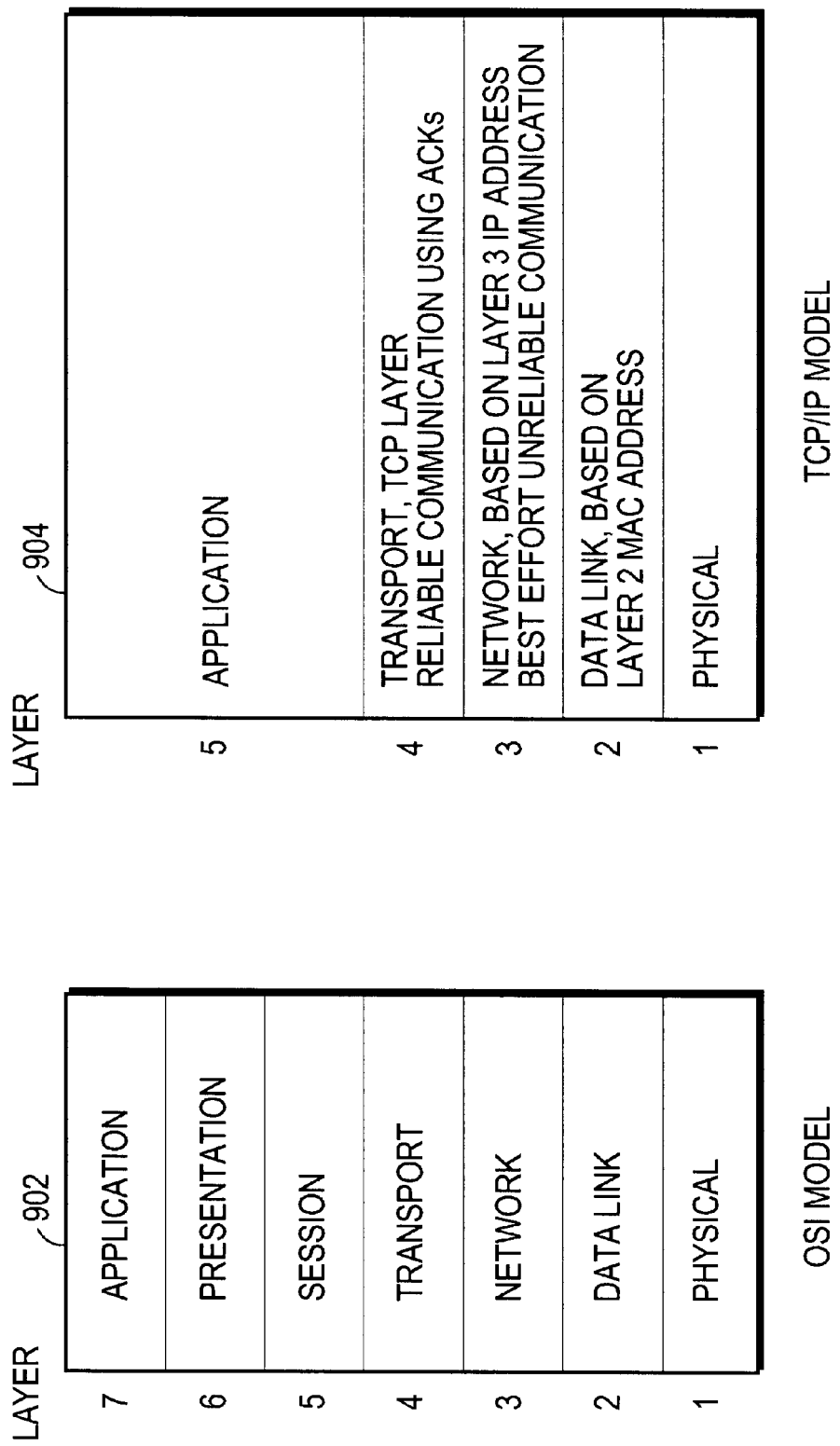
FIG. 9 is a block diagram of a network communications protocol.

Turning now to FIG. 9, a comparison between the Open System Interconnect (OSI) communications model and the TCP/IP (or Internet) communications model is shown. Column 902 gives the OSI reference communications model, and column 904 gives the TCP/IP communications model.

Both models have Layer 1, the physical layer. The physical layer comprises the hardware; used to connect two computers. Both models is make use of Layer 2, and in Layer 2 packets are addressed to a computer by placing the MAC address of the destination computer in a header of a frame of data. A bridge or a switch, such as a DLSw switch, responds to the MAC address of the destination computer in making a forwarding decision.

Both models make use of Layer 3, and in Layer 3 packets are addressed by the IP address of a destination computer. Routers respond o the Layer 3 address (IP address) of a packet in making routing decisions.

Both models make use of Layer 4, the transport layer for implementing reliable connection type communication between a source computer and a destination computer. For example, in the TCP/IP model of column 904, sequence numbers are placed in packets, and acknowledgement messages are sent from the destination computer to the source computer in order to inform the source computer that a message packet has arrived. The computers can determine that all packets of a message have arrived safely by referring to the sequence numbers.

In the TCP/IP model of column 904, after the packets have been reliably transferred from a source computer to a destination computer, the packets are handed from Layer 4 to the Application Layer at Layer 5. An application program in Layer 5 then uses the reliably transferred packets. More details concerning communications using the OSI model and the TCP/IP communications model are described by Andrew Tanenbaum in his book, *Computer Networks, Third Edition*, published by Prentice Hall publishing Company, Copyright date 1996, all disclosures of which are incorporated herein by reference, especially at pages 28–44. Further details concerning communications using the OSI model and also the TCP/IP protocol are given by Radia Perlman in her book *Interconnections*, published by Addison Wesley, Copyright date 1992, all disclosures of which are incorporated herein by reference.

Operation of peer-to-peer router switching, such as DLSw switching, makes use of both Layer 2 concepts and Layer 3 concepts. For example, LAN connections to router 500 through ports such as port 512 to LAN 1, etc., normally operate at Layer 2. Transfer of encapsulated packets using the DLSw protocol of RFC 1795 through ports such as port 544 and port 542 operates at Layer 3. However, as a packet arrives at a port from, for example, LAN 1 at port 512, and router 500 determines that the packet is to be transferred by DLSw protocol through port 544, the entire switching of the packet from input port 512 at Layer 2 to output port 544 using Layer 3 encapsulation with TCP/IP protocol at port 544, happens within router 500 transparently so that input port 512 sees only a Layer 2 transaction. For example, the protocol of the packet arriving at input port 512 may be an SNA packet travelling on an IEEE 802.5 token ring using source route bridging, and the outgoing packet on output port 544 is transferred over an Ethernet connection to ports 544 and 542 under TCP/IP protocol, all transparent to the LAN 1, the IEEE 802.5 token rings, connected to input port 512. Or, for example, the incoming packet may be a NetBios protocol packet, and still be transferred out through port 544 as an encapsulated packet transferred using TCP/IP protocol over an Ethernet connection. Further, a packet travelling in the other direction arrives at peer to peer input port 542, and is switched to depart through port 512 as an output port, all transparently to LAN 1 connected to port 512.

The peer to peer nature of router 500, representing routers 104, 106, 108, etc. of FIG. 1, permits rapid transmission of whatever protocol packet is received by router 500 from a LAN as an output packet over the peer to peer connection through network cloud 102. In order to initiate and maintain the peer to peer connection, directory service 110 provides a common address at which a peer router can discover facts about other peer routers. And the new and novel registration method of the present invention keeps the directory service 110 current as new routers are booted and register, and eliminates routers which are no longer active as their registrations time out.

Figure 10:
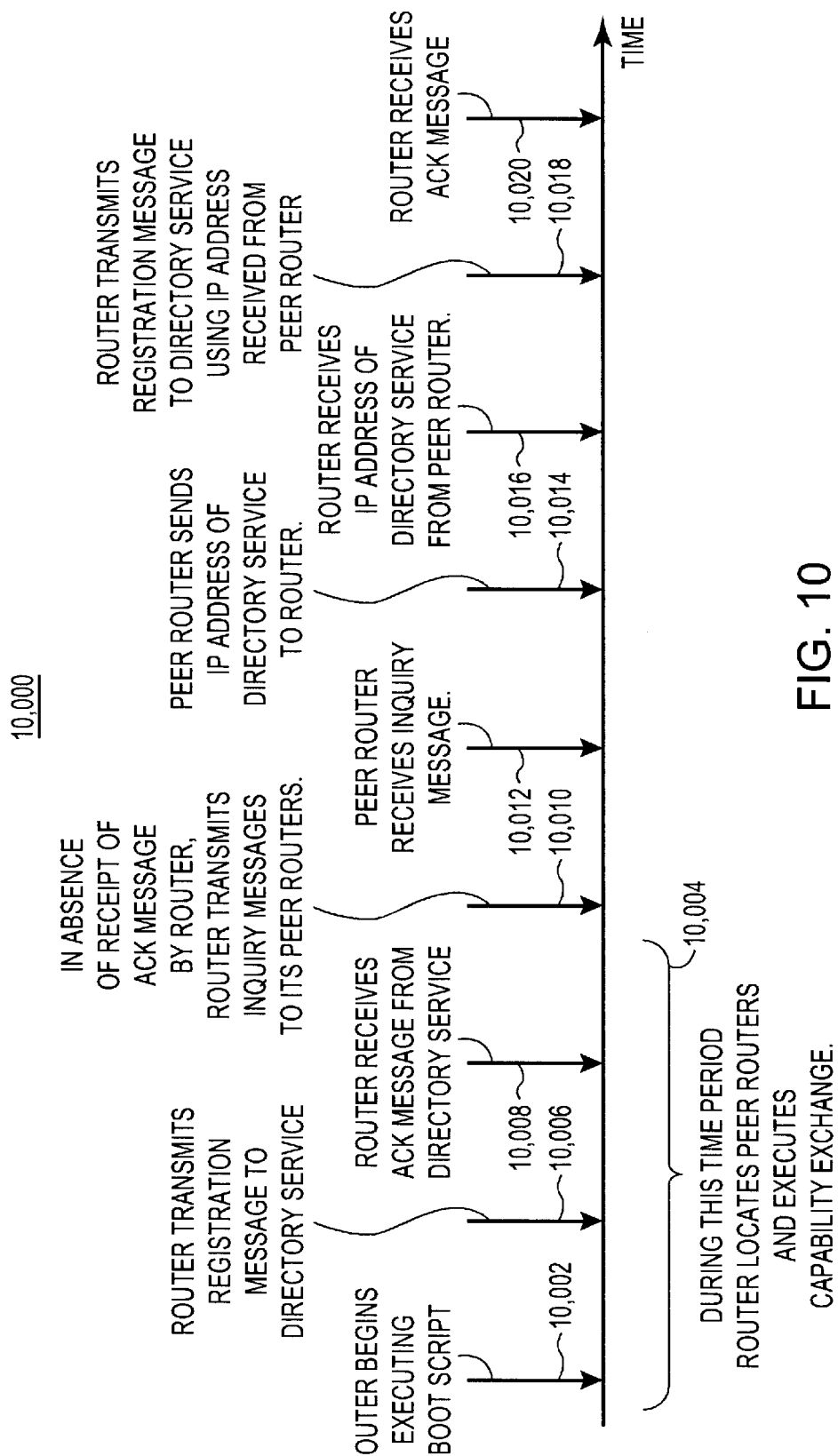
FIG. 10 is a timing diagram in accordance with the invention.

Turning now to FIG. 10, a time line 10,000 showing operation of a router is shown. Time line 10,000 shows operation of a router as it boots up and registers with a directory service. At time 10,002 the router begins executing a boot script. During time interval 10,004 the router executes a capability exchange with peer routers. For example, is a DLSw router exchanges capability information with its peer DLSw routers during time interval 10,004. At time 10,006 the router transmits a registration message to a directory service of peer routers. At time 10,008 the router receives an acknowledgement message (ACK message) from the directory service. The ACK received by the router at time 10,008 indicates to the router that a registration of the router in the directory service has occurred.

At time 10,010 the router times out its ACK timer, where the ACK timer expires after a time out interval in the event that no ACK message is received from the directory service in response to the registration message transmitted at time 10,006. In the absence of the receipt of an ACK message by the router from a directory service, at time 10,010 the router "realizes" that the attempt to register with the directory service has failed. Accordingly, at time 10,010 the router transmits an inquiry message to its peer routers, inquiring about an address for a directory service. The assumption is that the registration message transmitted by the router at time 10,006 was sent to a wrong address or was otherwise lost. By transmitting the inquiry message at time 10,010 the router is asking its peer routers for an address of a directory service of peer routers.

At time 10,012 the peer router receives an inquiry message. All of the peer routers of the router transmitting the inquiry message at time 10,010 may receive the inquiry message. At time 10,012 one of the peer routers, an exemplary peer router, has received the inquiry message. At time 10,014 the peer router receiving the inquiry message at time 10,012 transmits a reply message containing the protocol address, that is the IP address, of a directory service to the router. At time 10,016 the router receives the message transmitted at time 10,014 from one of its peer routers. The message from the peer router includes the protocol address, that is the IP address, of the directory service of peer routers. The router may receive a plurality of messages such as the exemplary message shown at time 10,016. The router can choose to use the first received message, or another algorithm may be adopted to determine which of the received messages will be used by the router.

At time 10,018 the router transmits a new registration message using the IP address that it received from a peer router at time 10,016. The registration message transmitted at time 10,018 will hopefully be received by the directory service, and an ACK message received by the router at time 10,020. The ACK message, of the type anticipated at time 10,010 but not received, will be received upon completion of the registration at time 10,020.

Transmittal of the peer inquiry message at time 10,010 by the router increases the robustness of the directory service registration process. In the event that the router begins booting at time 10,002, and transmits a registration message to a wrong address for a directory service at time 10,006, then the router recovers from this error at time 10,010 by transmitting an inquiry message to its peer routers. The peer routers have been located during time interval 10,004 during the capability exchange between peer routers. Upon transmission of a second registration message at time 10,018 using the IP address received from a peer router, the router then successfully achieves registration as the router learns from receipt of the ACK message at time 10,020.

It is to be understood that the above-described embodiments are simply illustrative of the principles of the invention. Various other modifications and changes may be made by those skilled in the art which embody the principles of the invention and fall within the spirit and scope thereof.

What is claimed is:

1. A method for establishing a directory of routers connected to a computer network comprising:
   executing a boot script by a selected router to bring said selected router into operation;
   transmitting, in response to executing said boot script, a registration message by said selected router to a directory service in a directory server, said registration message containing registration information about said selected router;
   creating by said directory service, in response to receiving said registration message, an entry for said selected router in a database of routers.

2. The method of claim 1 further comprising:
   transmitting said registration message using TCP/IP protocol.

3. The method as in claim 1 further comprising:
   receiving an acknowledgement message (ACK message) from said directory service indicating that an entry had been created in response to receipt of said registration message.

4. The method as in claim 1 further comprising:
   expiring an ACK timer in said selected router in the event that no ACK message is received from said directory server within an ACK timing interval, and in response to expiration of said ACK timer in said selected router, retransmitting said registration message.

5. The method as in claim 4 further comprising:
   transmitting, by said selected router, an inquiry message to peer routers known by said selected router, said inquiry message asking for an IP address of a directory service.

6. The method as in claim 1 further comprising:
   transmitting by said selected router, in response to receiving a message from a peer router giving said selected router an IP address of a directory service, a registration message to register said selected router with said directory service.

7. The method as in claim 1, further comprising:
   transmitting an update message by said selected router to said directory server to transfer additional information about said selected router to said database server.

8. The method of claim 7 wherein said step of transmitting an update message further comprises, periodically transmitting said update message.

9. The method of claim 1, further comprising:
   transmitting by said directory service, an update request to said selected router.

10. The method of claim 1 further comprising:
    maintaining said database of routers in an X.500 format database.

11. The method of claim 1 further comprising:
    communicating by said selected router and said directory service using an LDAP format.

12. A computer readable media having written thereon a program to execute the method of claim 1.

13. Electromagnetic signals transmitted over a computer network carrying information to establish a program in a computer to execute the method of claim 1.

14. A router, comprising:
    means for executing a boot script by a selected router to bring said selected router into operation;
    means four transmitting, in response to executing said boot script, a registration message by said selected router to a directory service, said registration message containing registration information about said selected router;
    means for creating by said directory service, in response to receiving said registration message, an entry for said selected router in a database of routers, in order to establish a directory of routers connected to a computer network.

15. A router, comprising:
    a CPU to execute a boot script to bring said router into operation;
    network circuits in said router to transmit, in response to executing said boot script, a registration message by said router to a directory service, said registration message containing registration information about said router;
    wherein a computer executing a server function and maintaining said directory service, in response to receiving said registration message, creates an entry for said router in a database of routers, in order to establish a directory of routers connected to a computer network.

16. A data structure stored in a computer memory, comprising:
    an entry received from a router as said router executes a boot script, said entry containing a Layer 2 address of said router and a Layer 3 IP address of said router;
    a field in said entry containing a time at which said entry was created;
    said entry being one of many entries, each created as each router of a plurality of routers transmits a registration message to said computer, as said each router executes a boot script, and as a timer expires in said each router.

17. A method for establishing a directory of routers connected to a computer network comprising:
    executing a boot script by a selected router to bring said selected router into operation;
    transmitting, in response to executing said boot script, a registration message by said selected router to a directory service, said registration message containing registration information about said selected router, and for said directory service, in response to receiving said registration message, to create an entry for said selected router in a database of routers.

18. A method for establishing a directory of routers connected to a computer network comprising:

executing a boot script by a selected router to bring said selected router into operation;

transmitting, in response to executing said boot script, a registration message by said selected router to a directory service, said registration message containing registration information about said selected router for said directory service, in response to receiving said registration message, to create an entry for said selected router in a database of routers;

receiving by said selected router an acknowledgement message (ACK message) from said directory service, said ACK message indicating that said selected router has been registered in said directory service, and in the event that said ACK message is not received during a timeout time interval, said selected router transmitting an inquiry message to peer routers of said selected router, said inquiry message arranged to cause a peer router receiving said inquiry message to transmit to said selected router an address of a directory service of routers;

transmitting, using said address of a directory service of routers received from a peer router, a registration message to said directory service.

19. A method for operating a router, comprising:

executing a boot script by said router to establish a directory of routers connected to a computer network;

transmitting, in response to executing said boot script, a registration message by said router to a directory service in a directory server, said registration message containing registration information about said router, creating, by said directory service in response to receiving said registration message, an entry for said router in a database of routers.

20. The method of claim 19, further comprising:

receiving an acknowledgment message (ACK message) from said directory service indicating that an entry had been created in response to receipt of said registration message.

21. The method of claim 20, further comprising:

expiring an ACK timer in said router in the event that no ACK message is received from said directory server within an ACK timing interval, and in response to expiration of said ACK timer, retransmitting said registration message.

22. The method of claim 19, further comprising:

transmitting an inquiry message to peer routers known by said router, said inquiry message asking for an IP address of a directory service, said directory service maintaining a database of routers.

23. The method of claim 19, further comprising:

transmitting, in response to receiving a message from a peer router giving an IP address of a directory service, a registration message to register with said database of routers in said directory service.

24. The method of claim 19, further comprising:

transmitting an update message to said directory server to transfer additional information about said router to said directory server.

25. The method of claim 19, further comprising:

receiving from said directory service an update request.

26. A router, comprising:

means for executing a boot script to bring said router into operation;

means for transmitting, in response to executing said boot script, a registration message by said router to a directory service in a directory server, said registration message containing registration information about said router, said directory service, in response to receiving said registration message, creating an entry for said router in a database of routers.

27. The apparatus of claim 26, further comprising:

a receiving port to receive an acknowledgment message (ACK message) from said directory service indicating that an entry had been created in response to receipt of said registration message.

28. The apparatus of claim 26, further comprising:

an ACK timer, said ACK timer expiring in the event that no ACK message is received from said directory server within an ACK timing interval, and in response to expiration of said ACK timer, retransmitting said registration message.

29. The apparatus of claim 26, further comprising:

a port to transmit an inquiry message to peer routers known by said router, said inquiry message asking for an IP address of a directory service, said directory service maintaining a database of routers.

30. The apparatus of claim 26, further comprising:

a processor to transmit, in response to receiving a message from a peer router giving an IP address of a directory service, a registration message to register with said database of routers in said directory service.

31. The apparatus of claim 26, further comprising:

a processor to transmit an update message to said directory server to transfer additional information about said router to said directory server.

32. The apparatus of claim 26, further comprising:

a receiving port to receive from said directory service an update request.

33. A router, comprising:

a processor to execute a boot script to bring said router into operation;

a port to transmit, in response to executing said boot script, a registration message by said router to a directory service in a directory server, said registration message containing registration information about said router, said directory service, in response to receiving said registration message, creating an entry for said router in a database of routers.

34. The apparatus of claim 33, further comprising:

a receiving port to receive an acknowledgment message (ACK message) from said directory service indicating that an entry had been created in response to receipt of said registration message.

35. The apparatus of claim 33, further comprising:

an ACK timer, said ACK timer expiring in the event that no ACK message is received from said directory server within an ACK timing interval, and in response to expiration of said ACK timer, retransmitting said registration message.

36. The apparatus of claim 33, further comprising:

a port to transmit an inquiry message to peer router known by said router, said inquiry message asking for an IP address of a directory service, said directory service maintaining a database of routers.

37. The apparatus of claim 33, further comprising:

a processor to transmit, in response to receiving a message from a peer router giving an IP address of a directory service, a registration message to register with said database of routers in said directory service.

38. The apparatus of claim 33, further comprising:

a processor to transmit an update message to said directory server to transfer additional information about said router to said directory server.

39. The apparatus of claim 33, further comprising:

a receiving port to receive from said directory service an update request.

40. Electromagnetic Signals propagating on a computer network, comprising:

said electromagnetic signals carrying information having instructions for execution on a processor for the practice of the method of in claim 1 or claim 17 or claim 18 or claim 19.

41. Computer readable media, comprising:

said computer readable media having information written thereon, said information having instructions for execution on a processor for the practice of the method of claim 1 or claim 17 or claim 18 or claim 19.

\* \* \* \* \*